(12) United States Patent
Hua-Yung

(10) Patent No.: US 6,603,460 B2
(45) Date of Patent: Aug. 5, 2003

(54) MOUSE STRUCTURE

(76) Inventor: Yin Hua-Yung, 11F-2, No. 43, Chai-I Street, Taichung City (TW)

( * ) Notice: Subject to any disclaimer, the term of this patent is extended or adjusted under 35 U.S.C. 154(b) by 158 days.

(21) Appl. No.: 09/736,572

(22) Filed: Dec. 15, 2000

(65) Prior Publication Data

US 2002/0075235 A1 Jun. 20, 2002

(30) Foreign Application Priority Data

Nov. 17, 2000 (TW) .................................. 89220079 U
Nov. 17, 2000 (TW) .................................. 89220080 U

(51) Int. Cl.$^7$ .................................................. G09G 5/08
(52) U.S. Cl. ...................... 345/163; 345/158; 345/164; 345/165
(58) Field of Search ................................. 345/163, 164, 345/165, 158, 39, 46, 82

(56) References Cited

U.S. PATENT DOCUMENTS

| | | | | |
|---|---|---|---|---|
| 5,717,427 A | * | 2/1998 | Lin | 345/163 |
| 6,225,981 B1 | * | 5/2001 | Lu | 345/164 |
| 6,400,356 B1 | * | 6/2002 | Bidiville et al. | 345/163 |
| 6,411,281 B1 | * | 6/2002 | Sasselli et al. | 345/163 |

* cited by examiner

*Primary Examiner*—Richard Hjerpe
*Assistant Examiner*—Kimhung Nguyen
(74) *Attorney, Agent, or Firm*—Charles E. Baxley

(57) ABSTRACT

A mouse structure includes a base and a cover mounted to the base. A recess is defined in a front portion of the cover for receiving buttons therein. A first far infra-red emitting member is connected to an underside of the cover and each of the buttons has a second far infra-red emitting member received therein.

2 Claims, 6 Drawing Sheets

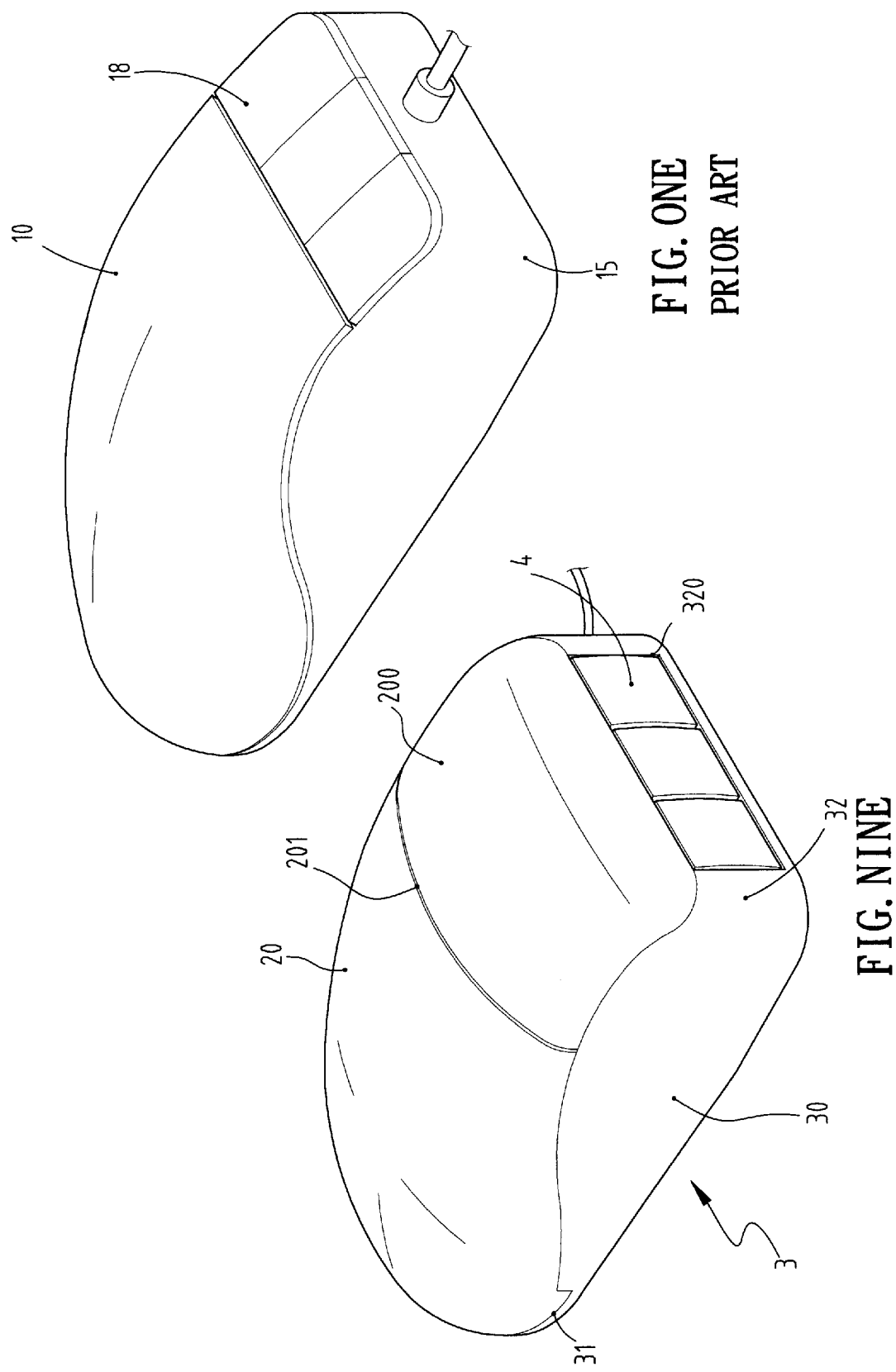

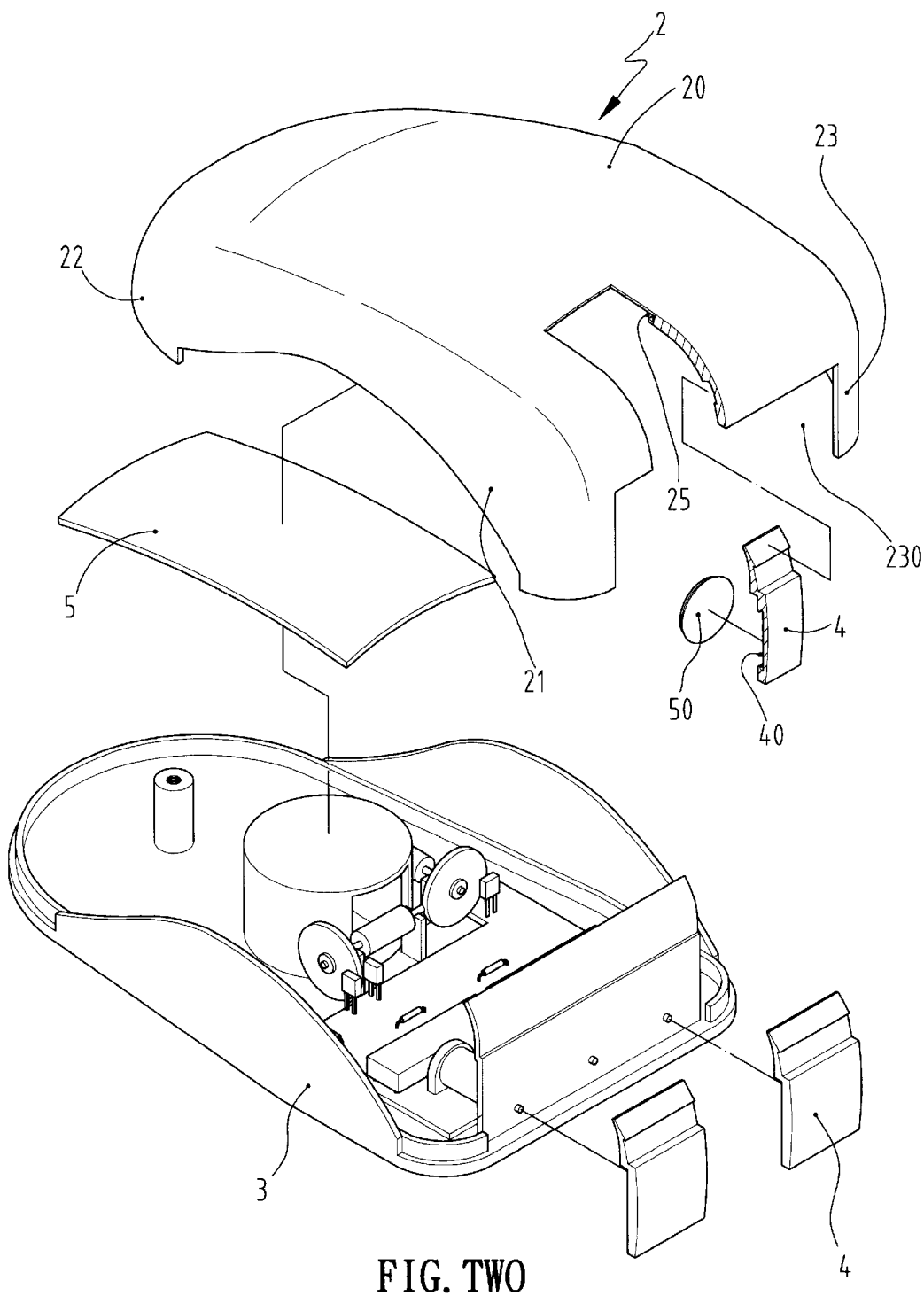
FIG. TWO

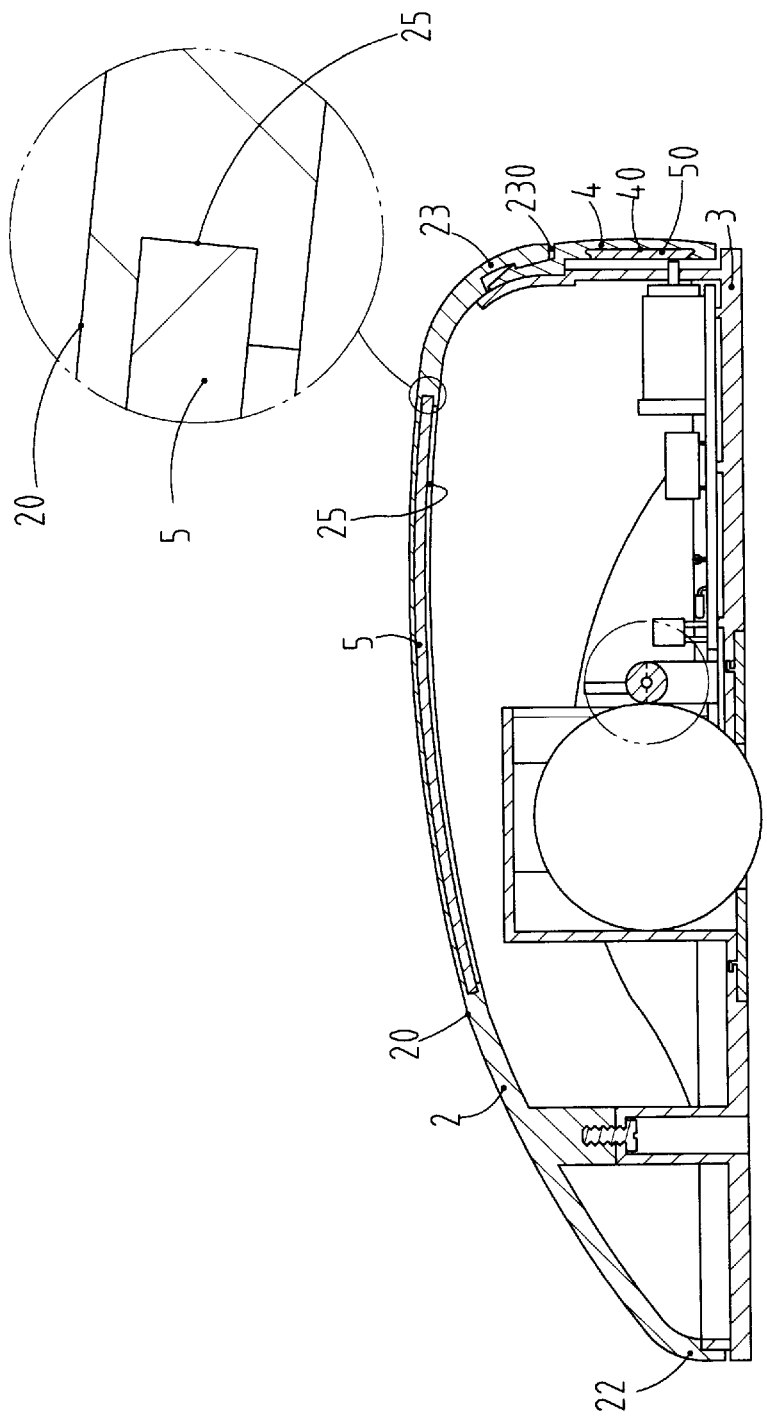
FIG. THREE

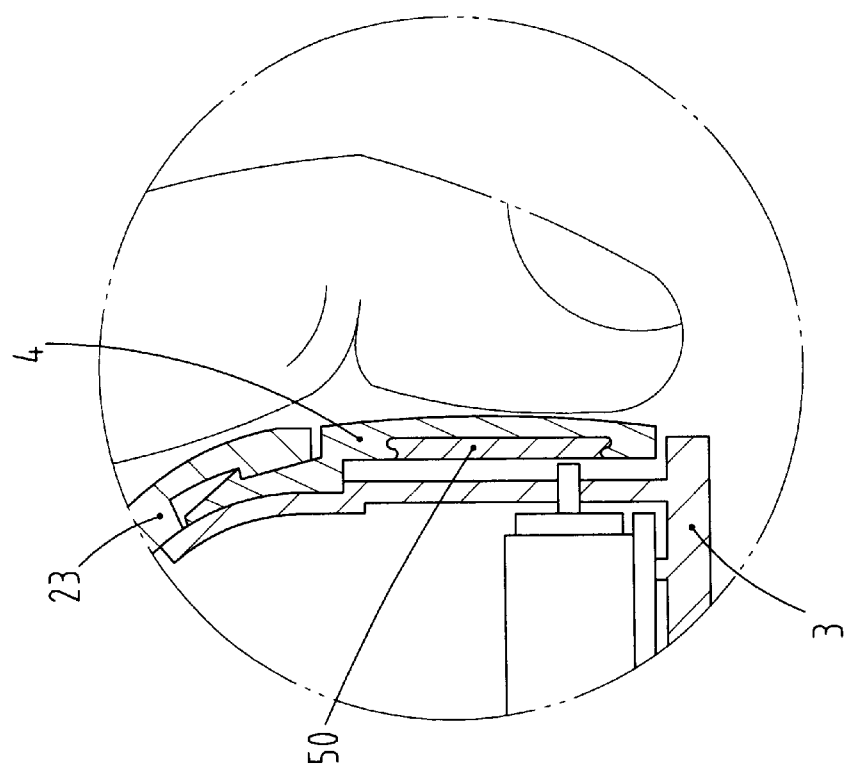
FIG. FIVE
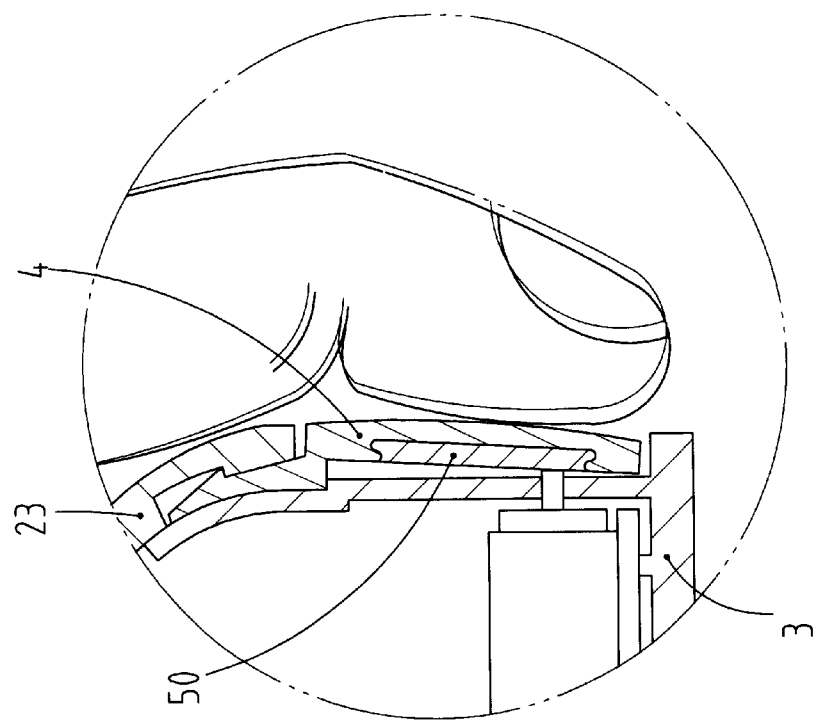
FIG. FOUR

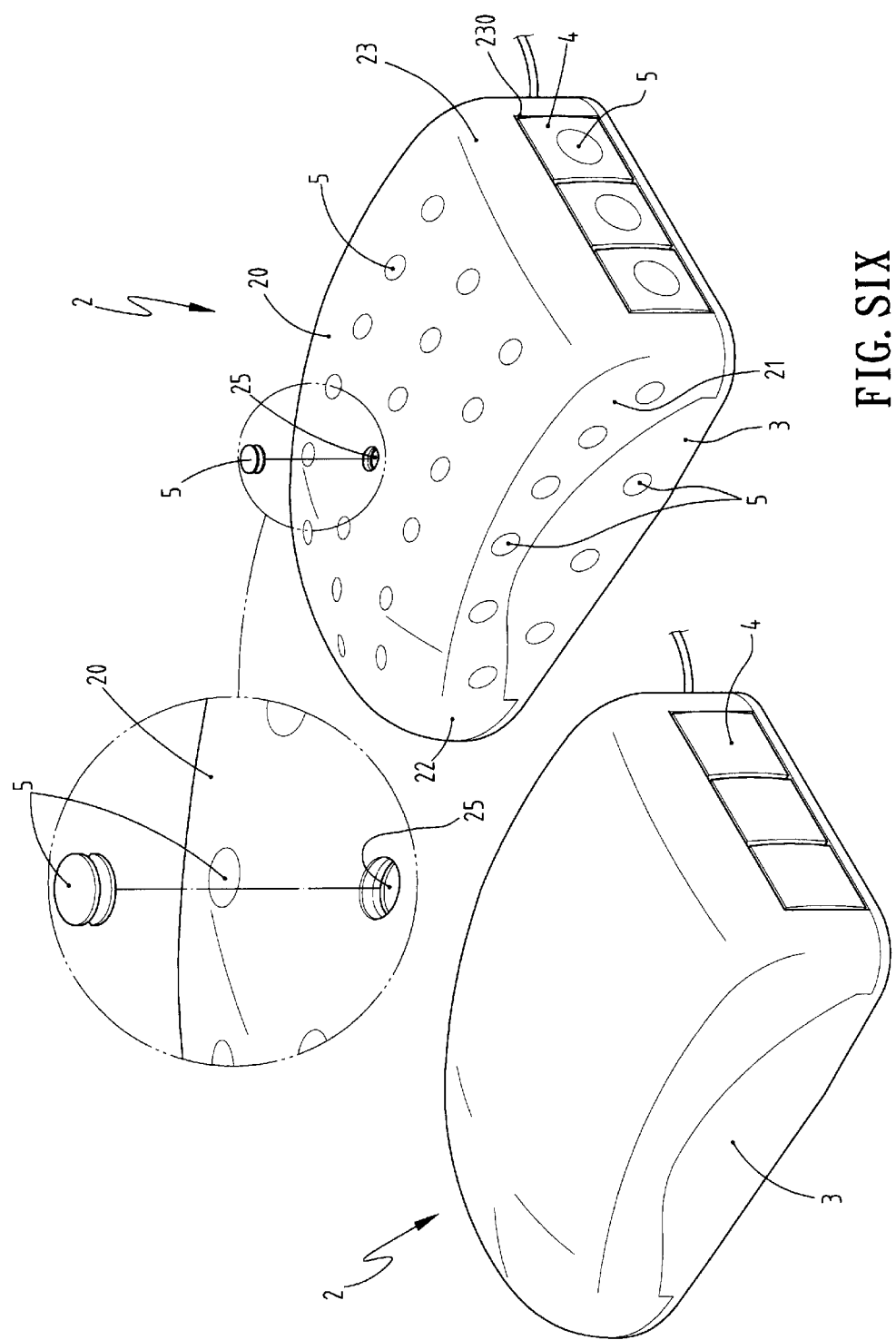

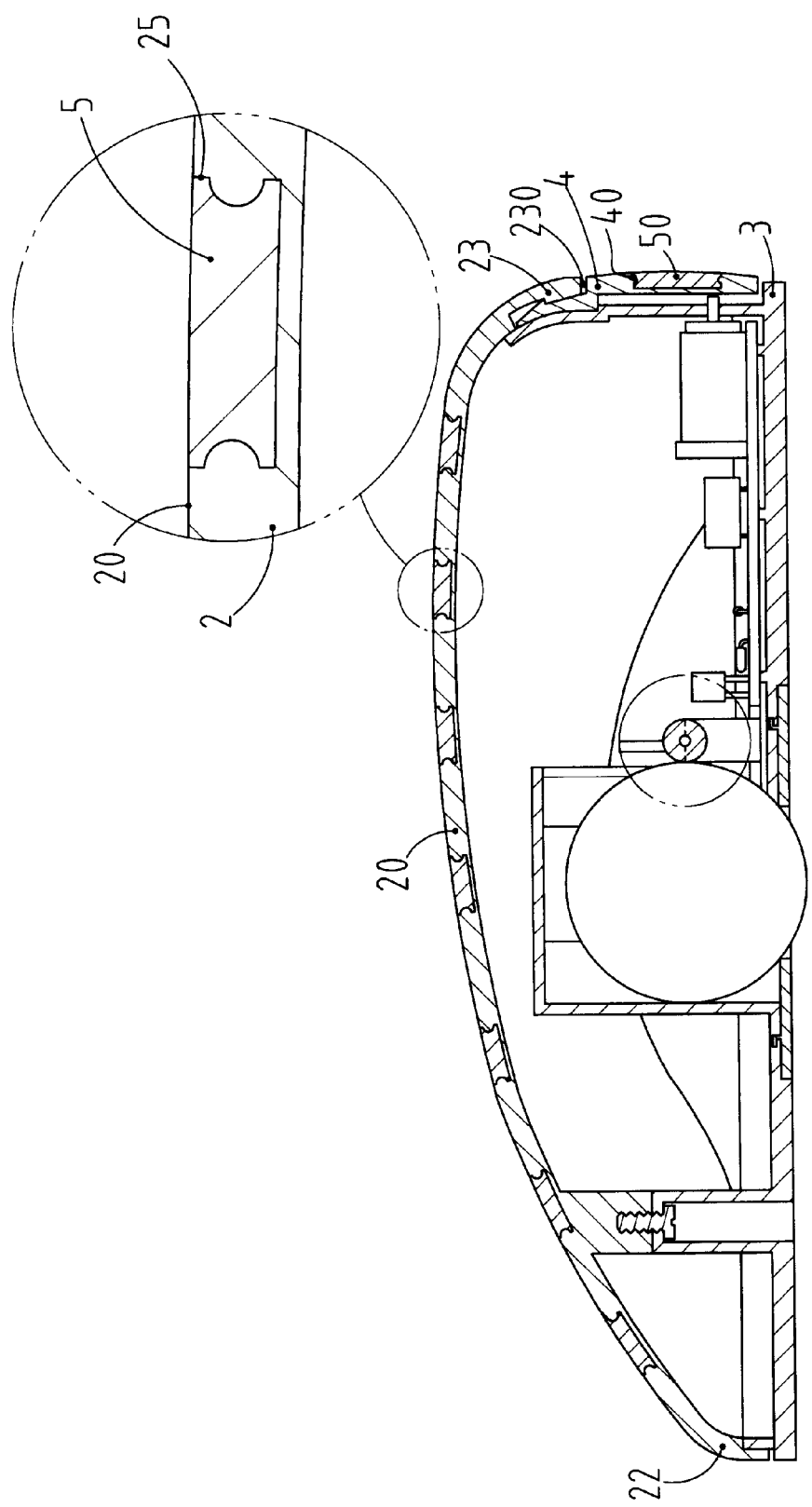
FIG. SEVEN

MOUSE STRUCTURE

FIELD OF THE INVENTION

The present invention relates to a mouse structure having material that emits far infra-red ray received in the top cap and each button of the mouse so as to energize the cells the circulation of blood to reduce fatigue of fingers and arm.

BACKGROUND OF THE INVENTION

A conventional mouse is shown in FIG. 1 and includes a base 15 with peripheral wall and a top cap 10 is connected to the peripheral wall of the base 15, and three buttons 18 connected on a top of a front end of the base 15. The top cap is made of plastic so that heat between the user's hand and the top cap may result sweat and feel uncomfortable. Of more importance is that the muscles of fingers and hand or arm are under stress and tension for a long period of time because people use mouse all-day-long. This problem is attracted people's attention so that many pad are developed to reduce the hurt of the hand and arm when using mouse. However, because the structure of the mouse is not yet changed dramatically so that the muscles of the fingers and the hand are put in a ready-for-use status and not be relax unless the user's hand moves away from the mouse.

The present invention intends to provide a mouse structure that includes material emitting far infra-red ray by the heat of body temperature and the far infra-read ray can eliminate fatigue from the users.

SUMMARY OF THE INVENTION

In accordance with one aspect of the present invention, there is provided a mouse structure and comprising a base and a cover which is mounted to the base and includes a top portion, a front portion having a recess defined therein, a rear portion and two sidewalls extending from two sides of the top portion. A first far infra-red emitting member is connected to an underside of the top portion and three buttons are engaged with the recess.

The primary object of the present invention is to provide a mouse that involves far infra-red emitting members received in the top portion and the buttons so as to release the fatigue of the user's finger and hand.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 is a perspective view to show a conventional mouse;

FIG. 2 is an exploded view to show a mouse structure of the present invention;

FIG. 3 is a cross sectional view to show mouse structure of the present invention;

FIG. 4 is a cross sectional view to show the buttons of the mouse structure of the present invention;

FIG. 5 is a cross sectional view to show that the buttons of the mouse structure of the present invention are pushed by user's finger;

FIG. 6 is an exploded view to show another embodiment of the mouse structure of the present invention;

FIG. 7 is a cross sectional view to show the mouse structure of the present invention as shown in FIG. 6;

FIG. 8 is a perspective view to show yet another embodiment of the mouse structure of the present invention, and FIG. 9 is a perspective view to show another embodiment of the mouse structure of the present invention.

DETAILED DESCRIPTION OF THE PREFERRED EMBODIMENT

Referring to FIGS. 2 to 5, the mouse structure of the present invention comprises a base 3 and a cover 2 which is mounted to the base 3 and includes a top portion 20, a front portion 23 extending from a front end of the top portion 20 and having a recess 230 defined therein, a rear portion 22 extending from a rear end of the top portion 20, and two sides 21 extending from two sides of the top portion 20. A recessed area 25 is defined in the underside of the top portion 20 and the first far infra-red emitting member 5 is received in the recessed area 25. Three buttons 4 are engaged with the recess 230 and each of the three buttons 4 has a concavity 40 defined in the inner side thereof and the second far infra-red emitting member 50 is received in the concavity 40.

By this way, when the user's hand holds on the mouse, the body temperature will let the first far infra-red emitting member 5 and the second far infra-red emitting member 50 emit far infra-red ray which is known to release the fatigue of muscles of the user's fingers and hand.

FIGS. 6 and 7 show another embodiment of the mouse structure wherein the top portion 20, two sidewalls 21 and the peripheral wall of the base 3 each have a plurality of apertures 25 defined therethrough and each aperture 25 has a first far infra-red emitting member 5 engaged therewith. Three buttons 4 are engaged with the recess 230 and each button 4 has a concavity 40 defined in the inner side thereof so as to receive the second far infra-red emitting member 50 therein.

FIG. 8 shows that the far infra-red material is mixed with the material made the cover 2, the base 3 and the buttons 4 so as to achieve the above-mentioned purpose. FIG. 9 shows that the top portion of the cover 2 is composed of two parts 20, 200 which are separated by a seam 201. It is to be noted that bio-ceramic material can also be used to make the parts of the mouse and the bio-ceramic includes material that emits far infra-red ray.

While we have shown and described various embodiments in accordance with the present invention, it should be clear to those skilled in the art that further embodiments may be made without departing from the scope and spirit of the present invention.

What is claimed is:

1. A mouse structure comprising:

a base and a cover which is mounted to said base and includes a top portion, a front portion extending from a front end of said top portion and having a recess defined therein, a rear portion extending from a rear end of said top portion, and two sidewalls extending from two sides of said top portion, a recessed area defined in an underside of said top portion and a first far infra-red emitting member received in said recessed area, at least two buttons engaged with said recess, each of said at least two buttons having a concavity defined in an inner side thereof and a second far infra-red emitting member received in said concavity.

2. A mouse structure comprising:

a base and a cover which is mounted to said base and includes a top portion, a front portion extending from a front end of said top portion and having a recess defined therein, a rear portion extending from a rear end of said top portion, and two sidewalls extending from two sides of said top portion, said top portion and said sidewalls each having a plurality of apertures defined therethrough and each aperture having a first far infra-red emitting member engaged therewith, at least two buttons engaged with said recess, each of said at least two buttons having a concavity defined in an inner side thereof and a second far infra-red emitting member received in said concavity.

* * * * *